US009363321B2

(12) United States Patent
Alger et al.

(10) Patent No.: US 9,363,321 B2
(45) Date of Patent: Jun. 7, 2016

(54) ANALYTICS BASED SCOPING OF HTML5 WEB STORAGE ATTRIBUTES

(71) Applicant: International Business Machines Corporation, Armonk, NY (US)

(72) Inventors: Joshua A. Alger, Raleigh, NC (US); Todd E. Kaplinger, Raleigh, NC (US); Stephen B. Williamson, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 77 days.

(21) Appl. No.: 14/076,041

(22) Filed: Nov. 8, 2013

(65) Prior Publication Data

US 2015/0134721 A1     May 14, 2015

(51) Int. Cl.
| G06F 15/16 | (2006.01) |
| H04L 29/08 | (2006.01) |
| H04L 12/26 | (2006.01) |
| G06F 3/06 | (2006.01) |

(52) U.S. Cl.
CPC .............. *H04L 67/146* (2013.01); *G06F 3/067* (2013.01); *H04L 43/0882* (2013.01); *H04L 67/02* (2013.01); *H04L 67/1097* (2013.01); *H04L 67/2852* (2013.01)

(58) Field of Classification Search
CPC .............. H04L 29/08072; H04L 29/06; H04L 29/06047; G06F 9/5016
USPC ........................................................ 709/203
See application file for complete search history.

(56) References Cited

U.S. PATENT DOCUMENTS

| 7,953,861 | B2* | 5/2011 | Yardley ................. H04L 67/142 709/203 |
| 8,706,649 | B1* | 4/2014 | Epis ....................... G06Q 30/06 705/344 |
| 8,738,711 | B2* | 5/2014 | Walsh ..................... H04L 67/02 709/203 |
| 2008/0256022 | A1* | 10/2008 | Guenther .......... G06F 17/30398 |
| 2008/0275982 | A1* | 11/2008 | Busch ................. G06F 17/3089 709/224 |
| 2009/0240809 | A1* | 9/2009 | La Frese ................ G06F 9/505 709/226 |
| 2011/0106874 | A1* | 5/2011 | Walsh ..................... H04L 67/02 709/202 |
| 2011/0145723 | A1* | 6/2011 | Walsh ................. H04L 67/1097 715/745 |
| 2011/0238944 | A1 | 9/2011 | Markova |
| 2012/0036264 | A1* | 2/2012 | Jiang ................. G06F 17/30902 709/226 |

* cited by examiner

Primary Examiner — Vivek Srivastava
Assistant Examiner — Atta Khan
(74) Attorney, Agent, or Firm — Steven M. Greenberg, Esq.; CRGO Law

(57) ABSTRACT

A method, system, and computer program product for optimizing storage of Web storage attributes through analytics is provided. The method includes identifying and storing in memory of a computer, utilization of different Web storage attributes by different end users across different Web application sessions from different Web browsers and analyzing the stored utilization of different Web storage attributes to identify a past scope of utilization for each of the different Web storage attributes. The method further includes, responsive to receiving a request from a requestor for an optimal storage location of a particular Web storage attribute, determining an identified past scope of utilization for the particular Web storage attribute, mapping the determined identified past scope of utilization for the particular Web storage attribute to the optimal storage location, and returning an indication of the mapped optimal storage location of the particular Web storage attribute to the requestor.

16 Claims, 3 Drawing Sheets

ANALYTICS BASED SCOPING OF HTML5 WEB STORAGE ATTRIBUTES

BACKGROUND OF THE INVENTION

1. Field of the Invention

The present invention relates to memory management during page processing and more particularly to optimizing memory management of Web storage attributes during page processing.

2. Description of the Related Art

Page processing refers to the receipt, interpretation and rendering of a markup language defined page in a content browser. The most well-known form of a page processing content browser at present is the venerable Web browser in which Web pages are received, processed and rendered. In a conventional Web browser, a markup language page—typically a page defined according to the hypertext markup language (HTML) markup language specification—can be received, interpreted and rendered in a display of a computer. Integral to the HTML processing capabilities of the Web browser is the cookie feature.

The cookie feature provides for short term data storage of state information for a Web page. Cookies have been used for many reasons including session management, personalization and tracking. However, according to the hypertext transfer protocol (HTTP) specification on statement management, a Web browser in respect to the use of cookies need only support a minimal number of cookies. In particular, according to the HTTP specification, a Web browser is expected only to be able to store three-hundred cookies of four kilobytes each, and only twenty cookies per server or domain.

While the cookie feature of HTML can provide a tempting mechanism for data storage in page processing, for many applications—and in particular in light of advances in the acquisition and transfer of digital information such as digital imagery and audio, a client side mechanism of greater capacity is desirable. The HTML version 5 specification addresses this need in defining "Web Storage." Web Storage picks up where cookies left off. In this regard, Web Storage provides both a simple application programming interface (API) to getter and setter methods for attributes specified in terms of key/value pairs, and also a default disk space quota of no less than five megabytes per fully qualified domain name.

Importantly, Web storage falls exclusively under the purview of client-side scripting. In other words, the scoping of Web storage attributes is under the discretion of a developer. Therefore, it is left to the developer to decide the lifetime of an attribute as well as the scope or location of where different attributes are stored, such as locally, for a HTTP session, or on a server. A Web storage attribute placed in local storage is per domain—the Web storage attribute is available to all scripts from the domain that originally stored the Web storage attribute. Therefore, a Web storage attribute placed in local storage, persists even after the Web browser closes. In contrast, session storage is per-page-per-window and is therefore temporally limited to the lifetime of the window. Of course, server side storage of an attribute persists for as long as the attribute remains in the server side storage and is made accessible to requesting pages.

Because scoping of the Web storage attributes are at the discretion of the developer, developers oftentimes misuse the scoping and storage of Web storage attributes, which can further reduce the scalability of a Web application. For example, when a developer stores an object that contains a vast amount of information, correct data placement storage problems can arise. For instance, if state or country lists occur in a form, but a developer stores the entire form into local memory, the memory on a computing device is not utilized most efficiently. Instead, information (state or country data) that is global or will not change based on a user should be stored on a server (or on a database on the server or on a database coupled to the server) and should be queried when needed rather than placed in local storage.

BRIEF SUMMARY OF THE INVENTION

Embodiments of the present invention address deficiencies of the art in respect to memory utilization in page processing and provide a novel and non-obvious method, system, and computer program product for optimizing storage of Web storage attributes through analytics. In an embodiment of the invention, a method for optimizing storage of Web storage attributes through analytics is provided and includes identifying and storing in memory of a computer, utilization of different Web storage attributes by different end users across different Web application sessions from different Web browsers. The method can further include analyzing the stored utilization of different Web storage attributes to identify a past scope of utilization for each of the different Web storage attributes and, responsive to receiving a request from a requestor for an optimal storage location of a particular Web storage attribute, determining an identified past scope of utilization for the particular Web storage attribute, mapping the determined identified past scope of utilization for the particular Web storage attribute to the optimal storage location, and returning an indication of the mapped optimal storage location of the particular Web storage attribute to the requestor.

Another embodiment of the invention provides a data processing system configured for optimizing storage of Web storage attributes through analytics. The system can include a server configured for communicative coupling to a client computing device. The server can also be coupled to a database and configured to execute an analytics module. The analytics module can include program code for identifying and storing in memory of the server, utilization of different Web storage attributes by different end users across different Web application sessions from different Web browsers. The analytics module can further include program code for analyzing the stored utilization of different Web storage attributes to identify a past scope of utilization for each of the different Web storage attributes. The analytics module can further include program code for determining an identified past scope of utilization for the particular Web storage attribute responsive to receiving a request from a requestor for an optimal storage location of a particular Web storage attribute, for mapping the determined identified past scope of utilization for the particular Web storage attribute to the optimal storage location, and for returning an indication of the mapped optimal storage location of the particular Web storage attribute to the requestor.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and, together with the description, serve to explain the principles of the invention. The embodiments illustrated herein are presently preferred; it being understood, however, that the invention is not limited to the precise arrangements and instrumentalities shown, wherein.

DETAILED DESCRIPTION OF THE INVENTION

Embodiments of the invention provide for optimizing storage of Web storage attributes through analytics. In accordance with an embodiment of the invention, utilization of different Web storage attributes by different end users across different Web application sessions from different Web browsers can be identified and stored. The stored utilization can be analyzed to identify a past scope of utilization for each of the Web storage attributes. Thereafter, in response to receiving a request from a requestor for an optimal storage location of a particular Web storage attribute, an identified past scope of utilization for the particular Web storage attribute can be determined and mapped to an optimal storage location, such as session storage, local storage or server storage. Finally, the optimal storage location can be returned to the requestor. In this way, the misuse of assigning storage locations to Web storage attributes can be minimized by providing analytics to the developer of an optimal storage location for a particular Web storage attribute.

Figure 1:
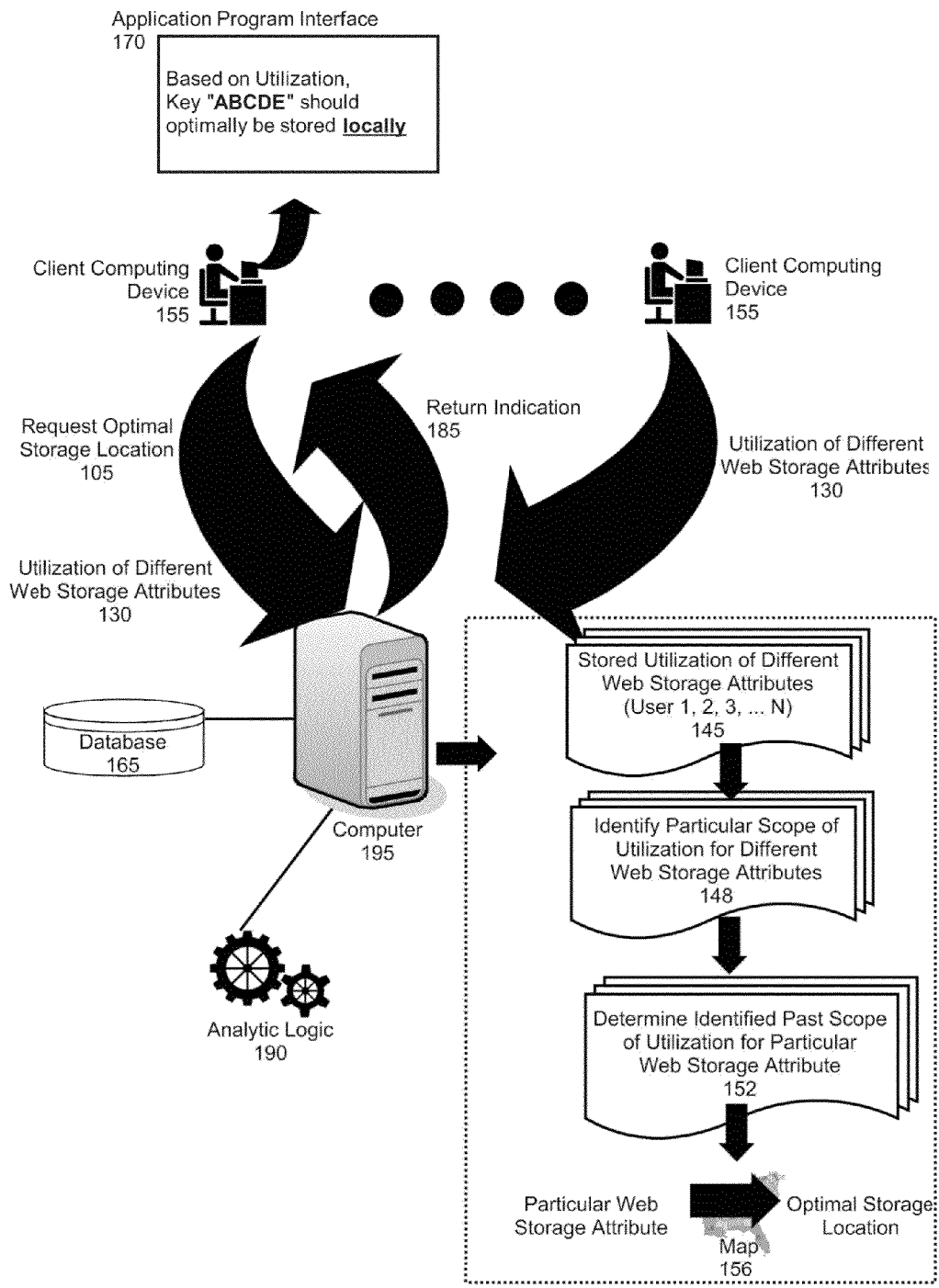
FIG. 1 is a pictorial illustration of a process for optimizing storage of Web storage attributes through analytics.

In further illustration, FIG. 1 pictorially shows a process optimizing storage of Web storage attributes through analytics. As shown in FIG. 1, utilization of different Web storage attributes 130 from at one least one client computing device 155 can be identified by analytic logic 190 on a computer 195, such as a server, for each create, read, update, and delete call from a web application to memory an end user, such as a developer, does on the client computing device 155. The utilization of different Web storage attributes by different end users across different Web application sessions from different Web browsers can also be identified by analytic logic 190. In other words, different Web storage attributes across different Web application sessions from different Web browsers from one client computing device 155 can be identified or different Web storage attributes across different Web application sessions from different Web browsers from multiple client computing devices 155 can be identified.

Regardless, the utilization of different Web storage attributes 130 can be stored by analytic logic 190 in memory on a computer 195, on a database 165 coupled to a computer 195, or on a database 165 on a computer 195. In addition, the utilization of different Web storage attributes 130 can include, but is not limited to, multiple, different keys, values, users, session identification (session ID), and total number of times a specific key and its corresponding value are assessed. Further, the stored utilization of different Web storage attributes 145 can be analyzed by analytic logic 190 to identify a past scope of utilization for each of the different Web storage attributes 148.

In response to a request 105 from a requestor from a client computing device 155 for an optimal storage location of a particular Web storage attribute, analytic logic 190 on a computer 195 can determine an identified past scope of utilization for the particular Web storage attribute 152. Of note, a particular Web storage attribute can be one of the different Web storage attributes or a particular Web storage attribute can be unrelated to the different Web storage attribute. In other words, a requestor may request an optimal storage location of a particular Web storage attribute that is not associated with one of the stored utilization of different Web storage attributes. In such a case, analytic logic 190 can produce an error that can be returned to the client computing device 155 which made the request 105.

Thereafter, analytic logic 190 can map the determined identified past scope of utilization for the particular Web storage attribute 156 to the optimal storage location. Upon mapping the determined identified past scope of utilization for the particular Web storage attribute to the optimal storage location, analytic logic 190 can return an indication 185 of the mapped optimal storage location of the particular Web storage attribute to the requestor. The indication of the mapped optimal storage location of a particular Web storage attribute can include, but it is not limited to, session persistent (session storage), local storage, and server (storage). Optionally, analytic logic 190 can display the indication of the mapped optimal storage location of the particular Web storage attribute in an application program interface 170.

Figure 2:
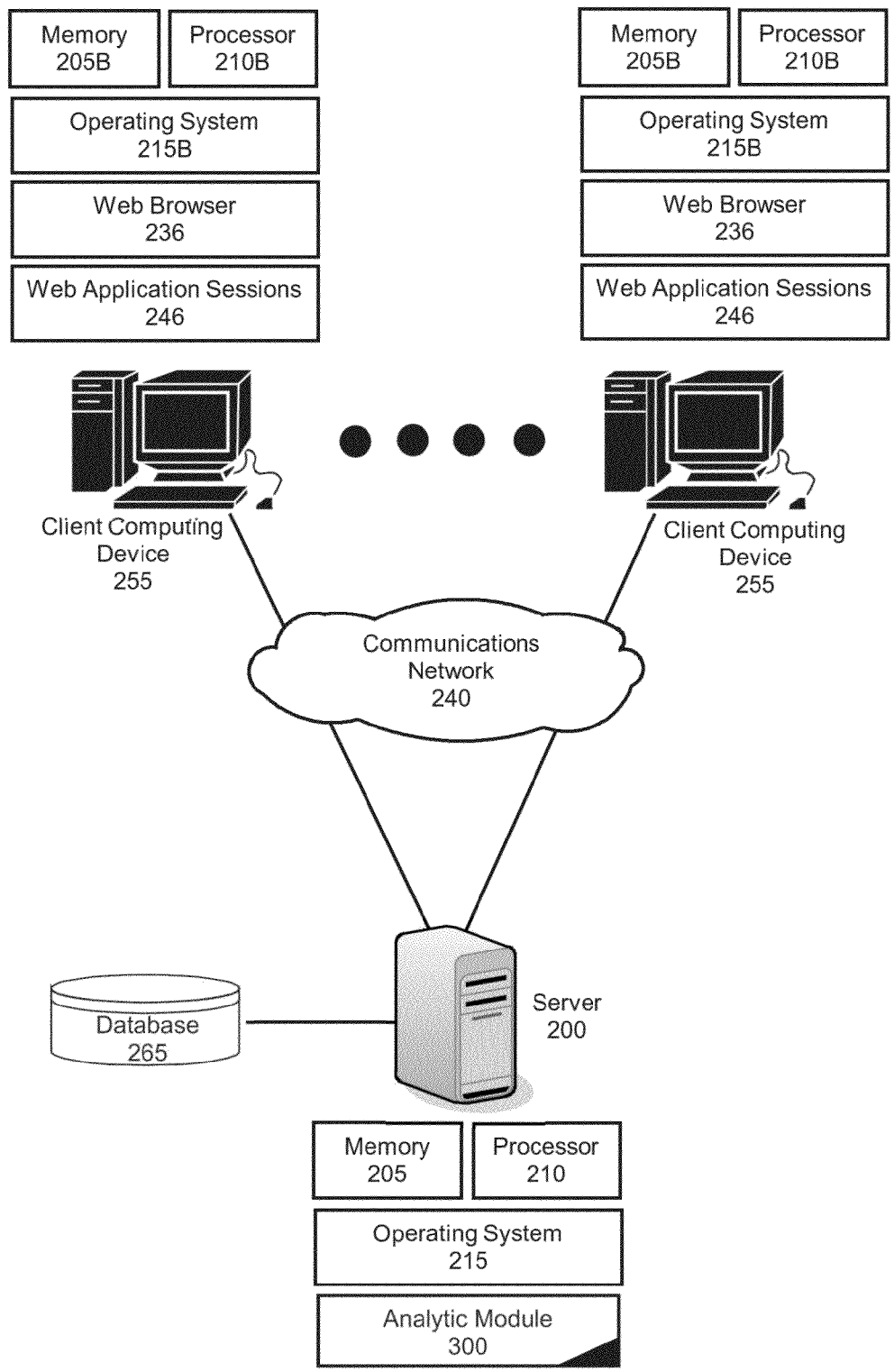
FIG. 2 is a schematic illustration of a data processing system configured for optimizing storage of Web storage attributes through analytics; and, FIG. 3 is a flow chart illustrating a process for optimizing storage of Web storage attributes through analytics.

The process described in connection with FIG. 1 can be implemented in a data processing system configured to optimize storage of Web storage attributes through analytics. In further illustration, FIG. 2 shows a data processing system configured to optimize storage of Web storage attributes through analytics. The system can include multiple, different client computing devices 255 coupled to a server 200 via a communications network 240. Each client computing device 255 can include at least one processor 210B and memory 205B supporting the execution of an operating system 215B. In addition, the operating system 215B of each client computing device 255 can support the execution of different Web application sessions 246 from different Web browsers 236. The server 200 can also include at least one processor 210 and memory 205 supporting the execution of an operating system 215. In addition, the server 200 can be coupled to a database 265. Yet further, the server 200 can be configured to execute an analytic module 300.

The analytic module 300 can include program code, which, when executed by at least one processor 210 on the server 200, can identify utilization of multiple, different Web storage attributes when certain calls, such as create, read, update, and delete, are made from different Web application session 246 (or just Web application) from different Web browsers to memory 205B by different end users on different client computing devices 255. Of note, the program code of the analytic module 300 can also identify utilization of different Web storage attributes across different Web application sessions 246 from different Web browsers 236 on just one client computing device 255. The program code of the analytic module 300 can further be enabled to store the identified utilization of different Web storage attributes by different end user across different Web application sessions 246 from different Web browsers 236. The utilization of different Web storage attributes can be stored in memory of the server 200 or stored in a database 265. Further, program code of the analytic module 300 can analyze the stored utilization of different Web storage attributes to identify a past scope of utilization for each of the different Web storage attributes.

Responsive to receiving a request from a requestor for an optimal storage location of a particular Web storage attribute, the program code of the analytic module 300 can determine an identified past scope of utilization for the particular Web storage device, can map the determined identified past scope of utilization for the particular Web storage attribute to the optimal storage location, and can return an indication of the mapped optimal storage location of the particular Web storage attribute to the requestor. In addition, program code of the analytic module 300 can display the indication of the mapped optimal storage location in an API on the client computing device 255 from which the request from the requestor for the optimal storage location of the particular Web storage attribute was received. Further, the indication of the mapped optimal storage location of the particular Web storage attribute can include, but is not limited to, session storage, local storage, and server storage.

Figure 3:
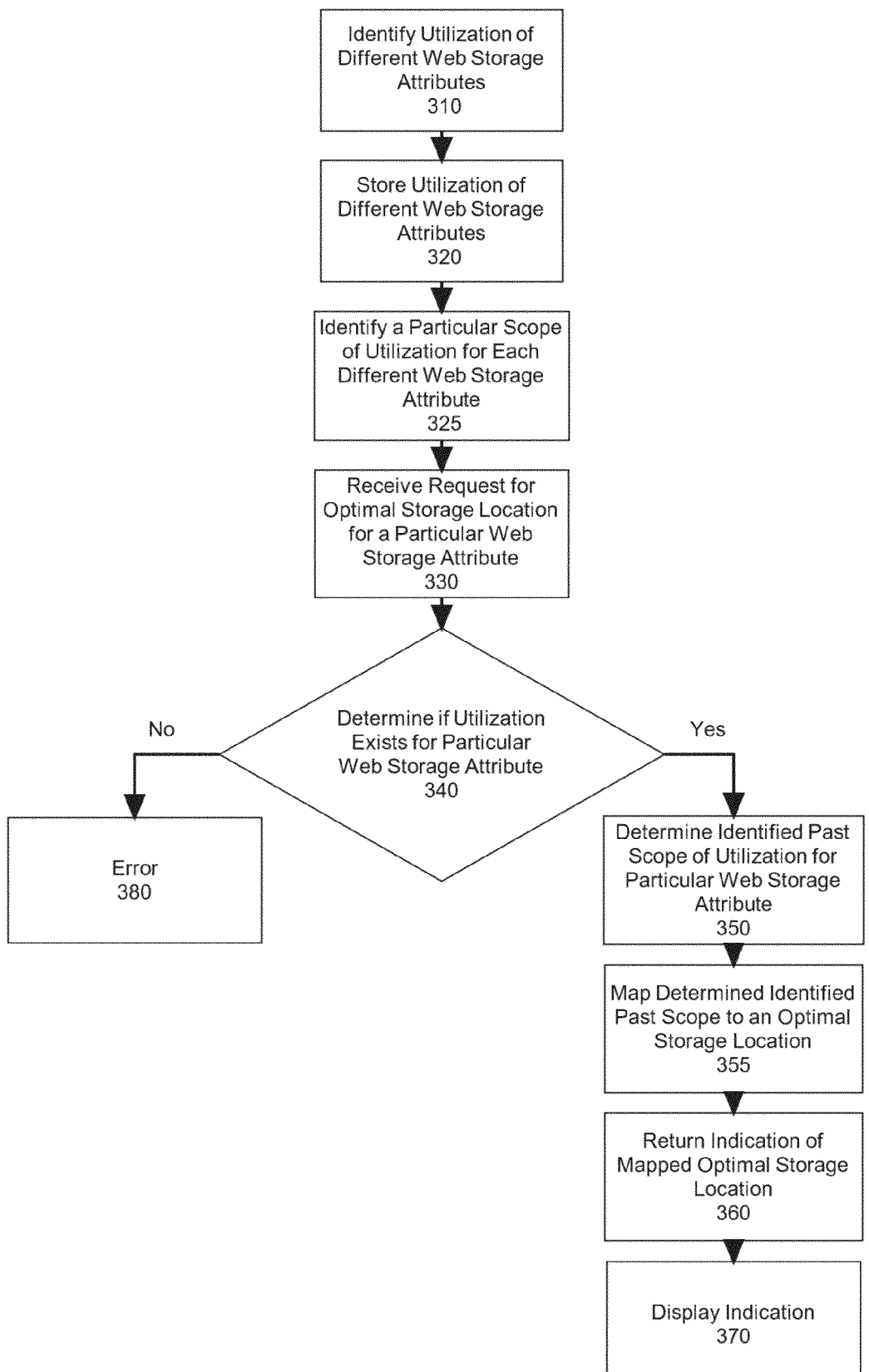

In even yet further illustration of the operation of the program code of the analytic module 300, FIG. 3 is a flow chart illustrating a process for optimizing storage of Web storage attributes through analytics. Beginning in block 310, utilization of different Web storage attributes by different end users across different Web application sessions from different Web browsers can be identified. Specifically, utilization can be identified from multiple, different end users on multiple, different computers for each create, read, update, and delete call from a web application to memory. The identified utilization of different Web storage attributes can be stored in memory of a computer, such as on server, as indicated in block 320. In addition, the identified utilization of different Web storage attributes can also be stored on a database on the server or on a database coupled to a server. As shown in block 325, a past scope of utilization for each of the different Web storage attributes can be identified by analyzing the stored utilization of different Web storage attributes.

Thereafter, a request for an optimal storage location for a particular Web storage attribute can be received from a requestor, as illustrated in block 330. Responsive to receiving the request from the requestor for an optimal storage location of a particular Web storage attribute, a determination can be made as to whether a utilization exists for a particular Web storage attribute, as shown in block 340. As shown in block 380, if a utilization does not exist for the particular Web storage attribute for which a request for an optimal storage location was received, an error can be generated that can be sent to the requestor. In other words, the particular Web storage attribute has yet to be utilized either by different end users or by the end user making the request, and, thus, is not one of the different Web storage attributes.

However, if the utilization does exist for the particular Web storage attribute for which a request for an optimal storage location was received, an identified past scope of utilization for the particular Web storage attribute can be determined, as in block 350. In other words, the particular Web storage attribute for which a request for an optimal storage location has been made has previously been utilized by either different end users or by the end user-requestor and, thus, is one of the different Web storage attributes. Further, as illustrated in block 355, the determined identified past scope of utilization for the particular Web storage attribute can be mapped to the optimal storage location. Thereafter, an indication of the mapped optimal storage location of the particular Web storage attribute can be returned to the requestor, as shown in block 360. Finally, the indication of the mapped optimal storage location can be displayed to the requestor, for example, in an API on the computer from which the request for the optimal storage location of the particular Web storage attribute from the requestor was received, as illustrated in block 370. Of note, the indication is not limited to being displayed in an API, but can also be displayed on a computer of the requestor and not in an API. Of further note, the indication of the mapped optimal storage location of the particular Web storage attribute can be include session storage, local storage, or server storage.

In further illustration of an embodiment of the invention for optimizing storage of Web storage attributes through analytics, utilization of different Web storage attributes can be stored on a server and utilized by the analytics module when a request is made.

| Key | Value | User | Session_ID | Access_Times |
| --- | --- | --- | --- | --- |
| Foo | Bar | Todd | xyz123 | 1 |
| Foo | Bar | Todd | mno456 | 2 |
| Foo | Ga | Joshua | kjl123 | 4 |
| Foo | Ga | Joshua | abc456 | 1 |
| Buggy | Whip | Todd | xyz123 | 8 |
| Buggy | Slip | Todd | mno456 | 3 |

Based on the table above, if a user "Stephen" wanted to know the recommended scope (optimal storage location) for the key "foo," program code of the analytics module would have determined that since multiple users accessed the same key value over multiple sessions, it would be more efficient to store the data on local storage, where it could stay persistent across sessions. On the other hand, if a scoping (optimal storage location) request was made for the key "buggy," the program code of the analytics module would have determined that efficiency is established when the key "buggy" is stored on the http session, since the values do not persist across sessions. Of note, the utilization in the table above is for illustration purposes only, as the data in the table is arbitrary.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage mediums would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A data processing system configured for optimizing storage of Web storage attributes through analytics, comprising:

a client computing device having at least one processor;

a server having at least one processor and a memory, the server configured for communicative coupling to the client computing device;

a database coupled to the server configured to store the utilization of different Web storage attributes by different end users across different Web application sessions from different Web browsers; and, an analytic module executing in the memory of the server, the analytic module comprising program code enabled to identify utilization of different Web storage attributes by different end users across different Web application sessions from different Web browsers, to store in the database utilization of different Web storage attributes by different end users across different Web application sessions from different Web browsers, to analyze the stored utilization of different Web storage attributes to identify a past scope of utilization for each of the different Web storage attributes, responsive to receiving a request from a requestor from the client computing device for an optimal storage location including one of a session storage, a local storage, and a server storage of a particular Web storage attribute, to determine an identified past scope of utilization for the particular Web storage attribute, to map the determined identified past scope of utilization for the particular Web storage attribute to the optimal storage location, to return an indication of the mapped optimal storage location of the particular Web storage attribute to the requestor at the client computing device, and to store the particular Web storage attribute during page processing according to the indication of the mapped optimal storage location, resulting in an optimization of memory management during page processing, wherein the program code to identify the utilization of different Web storage attributes by different end users across different Web application sessions from different Web browsers, comprises program code to identify each create, read, update, and delete call from a web application to a memory of one of different client computing devices, the different client computing devices supporting different end users across different Web application sessions from different Web browsers.

2. The system of claim 1, wherein the particular Web storage attribute is one of the different Web storage attributes.

3. The system of claim 1, wherein the program code of the analytics module is further enabled to display the indication of the mapped optimal storage location in an application program interface (API) on the client computing device from which the request from the requestor for the optimal storage location of the particular Web storage attribute was received.

4. The system of claim 1, wherein the indication of the mapped optimal storage location of the particular Web storage attribute is session storage.

5. The system of claim 1, wherein the indication of the mapped optimal storage location of the particular Web storage attribute is local storage.

6. The system of claim 1, wherein the indication of the mapped optimal storage location of the particular Web storage attribute is server storage.

7. A computer program product for optimizing storage of Web storage attributes through analytics, the computer program product comprising:

a non-transitory computer readable storage medium having computer readable program code embodied therewith, the computer readable program code comprising:

computer readable program code for identifying utilization of different Web storage attributes by different end users across different Web application sessions from different Web browsers comprising computer readable program code for identifying each create, read, update, and delete call from a web application to a memory of one of different client computers, the different client computing devices supporting different end users across different Web application sessions from different Web browsers;

computer readable program code for storing in a database the utilization of different Web storage attributes by different end users across different Web application sessions from different Web browsers;

computer readable program code for analyzing the stored utilization of different Web storage attributes to identify a past scope of utilization for each of the different Web storage attributes;

computer readable program code for determining an identified past scope of utilization for a particular Web storage attribute in response to receiving a request from a requestor from a client computer for an optimal storage location including one of a session storage, a local storage, and a server storage of the particular Web storage attribute, mapping the determined identified past scope of utilization for the particular Web storage attribute to the optimal storage location, and returning an indication of the mapped optimal storage location of the particular Web storage attribute to the requestor at the client computer; and, computer readable program code for storing the particular Web storage attribute during page processing according to the indication of the mapped optimal storage location, resulting in an optimization of memory management during page processing.

8. The computer program product of claim 7, wherein the particular Web storage attribute is one of the different Web storage attributes.

9. The computer program product of claim 7, further comprises computer readable program code for displaying the indication of the mapped optimal storage location in an application program interface (API) on a computer from which the request from the requestor for the optimal storage location of the particular Web storage attribute was received.

10. The computer program product of claim 7, wherein the indication of the mapped optimal storage location of the particular Web storage attribute is session storage.

11. The computer program product of claim 7, wherein the indication of the mapped optimal storage location of the particular Web storage attribute is local storage.

12. The computer program product of claim 7, wherein the indication of the mapped optimal storage location of the particular Web storage attribute is server storage.

13. The system of claim 1, wherein the program code to identify the utilization of different Web storage attributes by different end users across different Web application sessions from different Web browsers, further comprises program code to identify a total number of times a specific key and its corresponding value are accessed.

14. The computer program product of claim 7, wherein the computer readable program code for identifying the utilization of different Web storage attributes by different end users across different Web application sessions from different Web browsers, further comprises computer readable program code for identifying a total number of times a specific key and its corresponding value are accessed.

15. The system of claim 1, wherein the program code to determine the identified past scope of utilization for the particular Web storage attribute, comprises program code to determine whether different end users accessed a same specific key and its corresponding value across different Web application sessions.

16. The computer program product of claim 7, wherein the computer readable program code for determining the identified past scope of utilization for the particular Web storage attribute, comprises computer readable program code to determine whether different end users accessed a same specific key and its corresponding value across different Web application sessions.

* * * * *